US012793914B2

(12) United States Patent
Chen et al.

(10) Patent No.: US 12,793,914 B2
(45) Date of Patent: Nov. 10, 2026

(54) ROLLER MODULE

(71) Applicant: Primax Electronics Ltd., Taipei (TW)

(72) Inventors: Bo-An Chen, Taipei (TW); Wei-Ching Kuo, Taipei (TW)

(73) Assignee: Primax Electronics Ltd., Taipei (TW)

( * ) Notice: Subject to any disclaimer, the term of this patent is extended or adjusted under 35 U.S.C. 154(b) by 270 days.

(21) Appl. No.: 18/777,180

(22) Filed: Jul. 18, 2024

(65) Prior Publication Data

US 2025/0226164 A1 Jul. 10, 2025

Related U.S. Application Data

(60) Provisional application No. 63/617,929, filed on Jan. 5, 2024.

(51) Int. Cl.
*H01H 19/00* (2006.01)

(52) U.S. Cl.
CPC ....... *H01H 19/003* (2013.01); *H01H 2227/00* (2013.01)

(58) Field of Classification Search
CPC ........... H01H 2003/00; H01H 2003/02; H01H 2003/028; H01H 2003/08; H01H 2003/12; H01H 2013/00; H01H 2013/02; H01H 2221/00; H01H 2221/008; H01H 2221/01; H01H 2221/018; H01H 3/00; H01H 3/02; H01H 3/12; H01H 3/04; H01H 13/00; H01H 13/025; H01H 13/14; H01H 13/20; H01H 13/50; H01H 13/70; H01H 13/705; H01H 19/00; H01H 19/03; H01H 19/02; H01H 19/001; H01H 19/003; H01H 19/14; H01H 19/20; H01H 19/54; H01H 19/56; H01H 2227/00
USPC .............................................................. 200/4
See application file for complete search history.

(56) References Cited

U.S. PATENT DOCUMENTS 5,745,057 A * 4/1998 Sasaki .................... H03G 3/001 341/35
2022/0342497 A1* 10/2022 Kao ...................... G06F 3/0362

* cited by examiner

*Primary Examiner* — Anthony R Jimenez
(74) *Attorney, Agent, or Firm* — KIRTON McCONKIE; Evan R. Witt

(57) ABSTRACT

A roller module includes a roller, a circuit board and a bracket. The roller includes an operating part and a turntable part. The operating part and the turntable part are rotatable synchronously along a rotation axis line. A first rotating shaft and a second rotating shaft are respectively protruded from two opposite sides of the turntable part along the rotation axis line. An encoder and a push switch are disposed on the circuit board. The first rotating shaft is connected with the encoder. The bracket includes a fulcrum part, an effort part and a load part. The effort part is arranged between the fulcrum part and the load part. The effort part includes a sleeve. The second rotating shaft is accommodated within the sleeve. The load part is contacted with a top side of the push switch.

6 Claims, 5 Drawing Sheets

ROLLER MODULE

CROSS-REFERENCE TO RELATED APPLICATION

This application claims priority to U.S. Provisional Patent Application No. 63/617,929 filed Jan. 5, 2024, the contents of which are incorporated herein by reference.

FIELD OF THE INVENTION

The present invention relates to a roller module, and more particularly to a roller module in a compact arrangement.

BACKGROUND OF THE INVENTION

Conventionally, a scroll wheel (or a roller) is applied to an electronic device such as a mouse, a keyboard or an audio/video control device. Generally, in case that the roller supports the function of being triggered in a push-down manner, a push switch is directly located under the roller shaft. Consequently, when the roller is pressed down to trigger the push switch, a press triggering signal is generated.

However, in case that plural rollers need to be arranged side by side in an electronic device, some problems occur. For example, since the square push switch has a certain width, the spacing distance between every two rollers will be restricted by the push switch and unable to be effectively reduced. Therefore, in order to installing rollers in a compact arrangement, the existing roller design still needs to be further improved.

SUMMARY OF THE INVENTION

In order to overcome the drawbacks of the conventional technologies, the present invention provides a roller module. In the roller module, a push switch is located at the position away from a roller shaft, and a bracket linked to the pressing action of the roller is corresponding installed to trigger the push switch. Since the spacing distance between two rollers is effectively reduced, the purpose of installing rollers in a compact arrangement will be achieved.

In accordance with an aspect of the present invention, a roller module is provided. The roller module includes a roller, a circuit board and a bracket. The roller includes an operating part and a turntable part. The operating part and the turntable part are rotatable synchronously along a rotation axis line. A first rotating shaft and a second rotating shaft are respectively protruded from two opposite sides of the turntable part along the rotation axis line. An encoder and a push switch are disposed on the circuit board. The first rotating shaft is connected with the encoder. The bracket includes a fulcrum part, an effort part and a load part. The effort part is arranged between the fulcrum part and the load part. The effort part includes a sleeve. The second rotating shaft is accommodated within the sleeve. The load part is contacted with a top side of the push switch. When the roller is pressed down, the fulcrum part is a support structure, and the load part is moved downwardly to trigger the push switch.

In an embodiment, the circuit board has a top surface, a bottom surface and an opening. The opening is in communication with the top surface and the bottom surface, and a portion of the roller is penetrated downwardly through the opening.

In an embodiment, the roller module further includes a base member, and the base member is located under the circuit board. The base member includes a hook, and the hook is penetrated upwardly through the opening and then exposed outside.

In an embodiment, the fulcrum part and the effort part are connected with each other through a first arm, and the effort part and the load part are connected with each other through a second arm. The second arm includes a position-limiting hole. The base member includes a positioning piece. The positioning piece is penetrated upwardly through the opening and inserted into the position-limiting hole.

In an embodiment, the position-limiting hole is a through-hole structure or a blind hole structure.

In an embodiment, the fulcrum part includes a rotating shaft, and the rotating shaft is installed in the hook. Consequently, the bracket is rotatable by using the rotating shaft as a fulcrum.

In an embodiment, the encoder is a mechanical encoder, and the first rotating shaft is inserted into the mechanical encoder.

In an embodiment, a protrusion structure is formed on a bottom side of the load part of the bracket, and the protrusion structure is contacted with the push switch.

In an embodiment, a width of the bracket is smaller than a width of the push switch along a direction in parallel with the rotation axis line.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
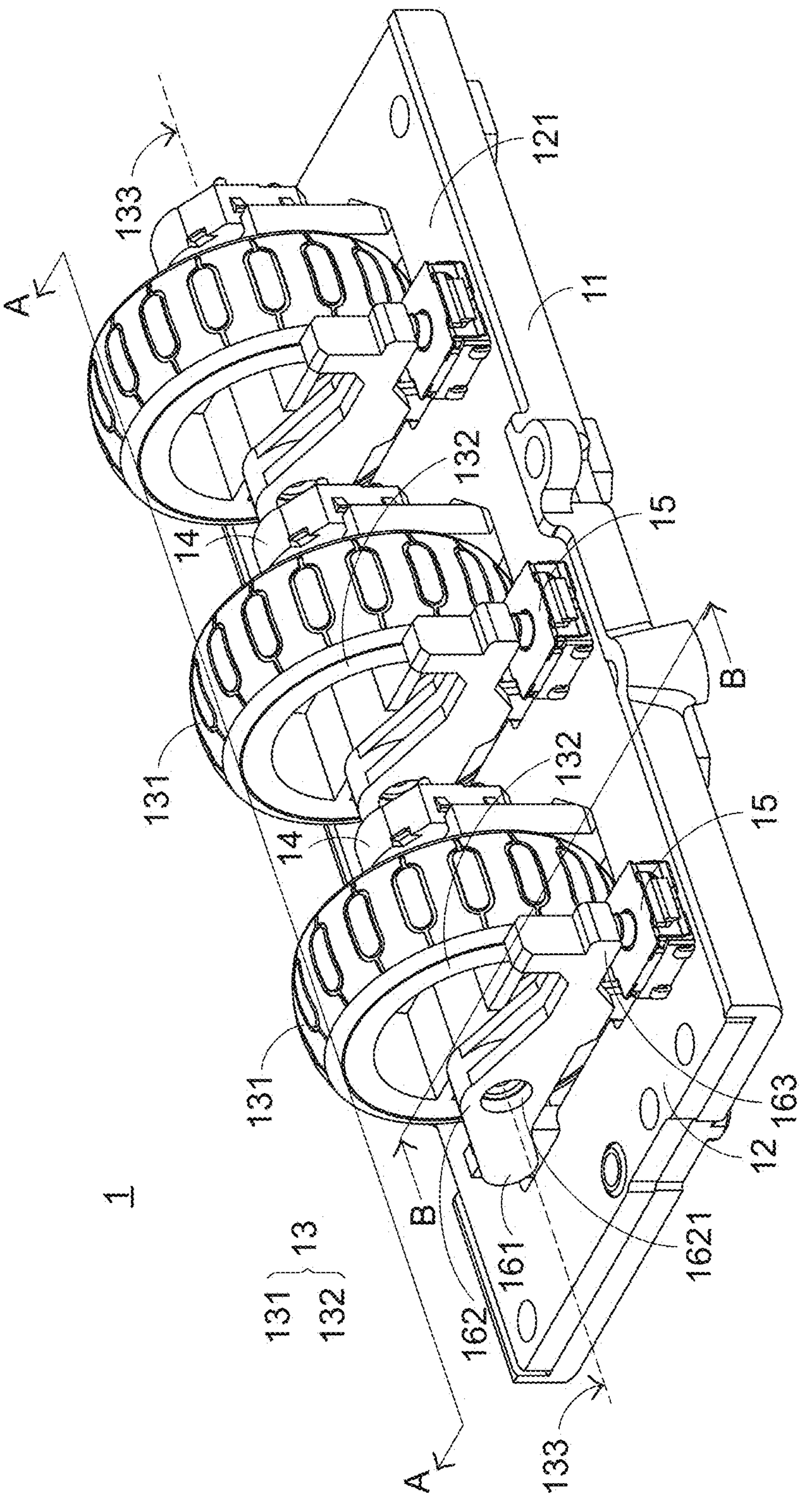
FIG. 1 is a schematic perspective view illustrating a roller module according to an embodiment of the present invention.
Figure 2:
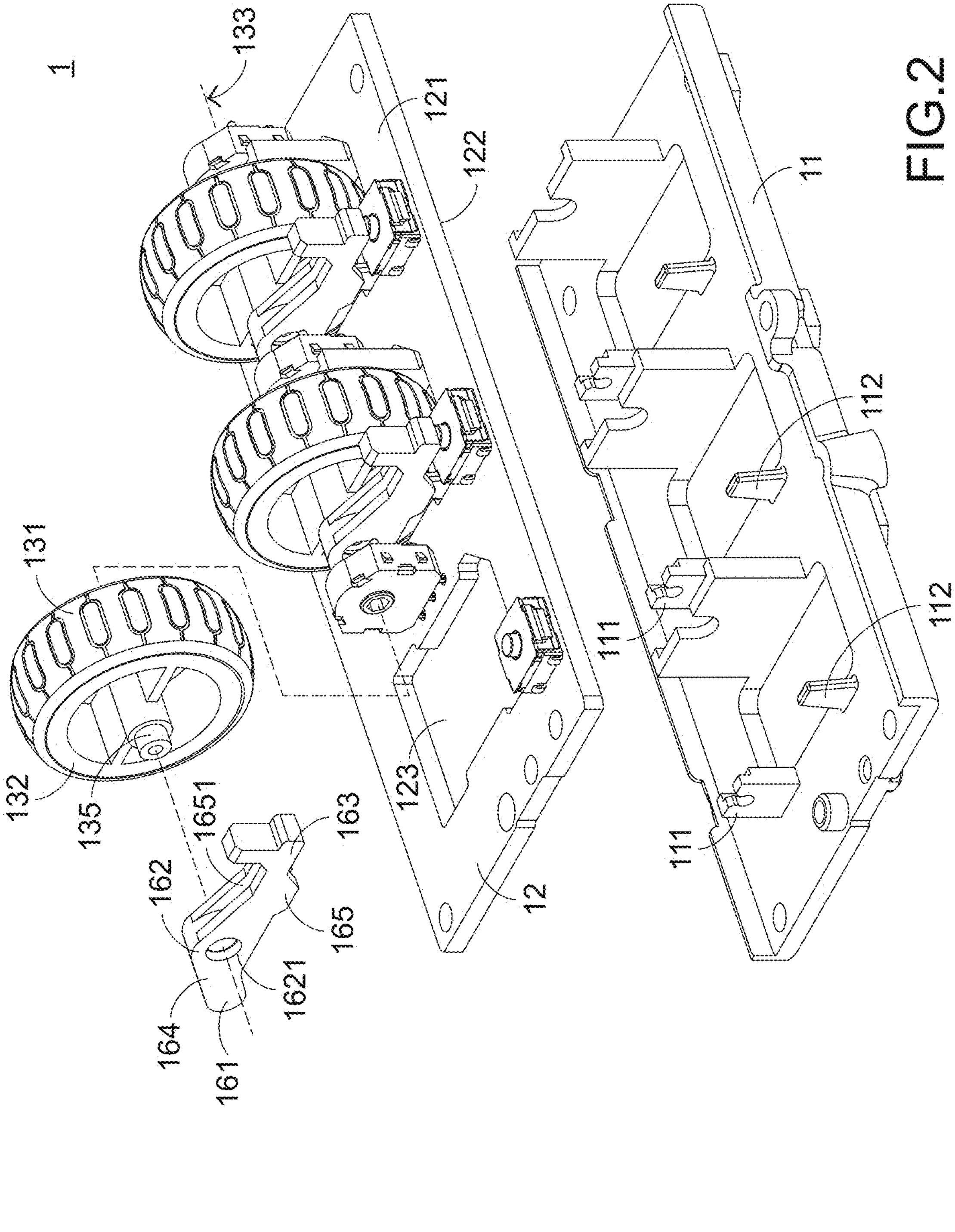
FIG. 2 is a schematic exploded view illustrating the roller module shown in FIG. 1.
Figure 3:
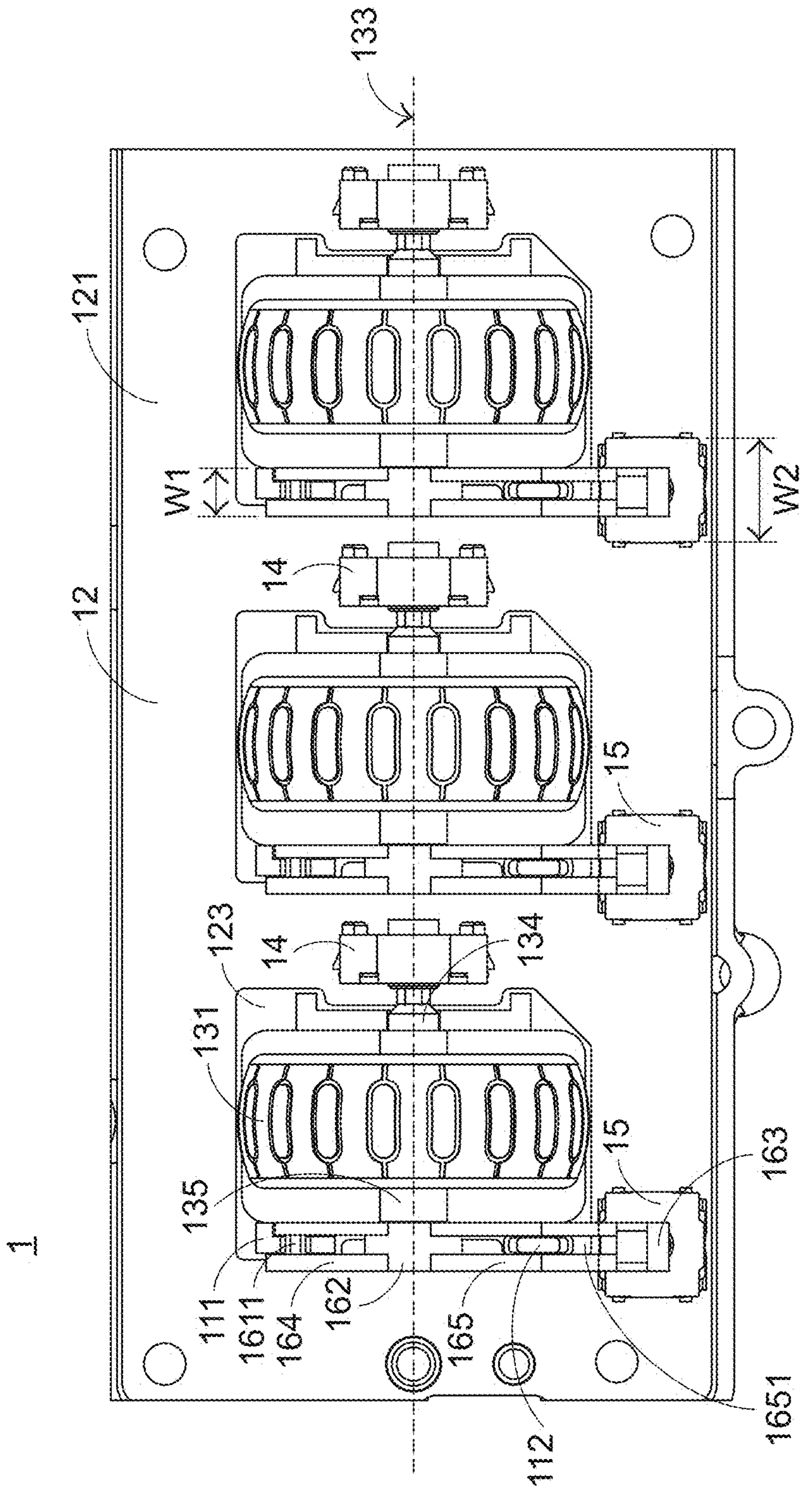
FIG. 3 is a schematic top view illustrating the roller module shown in FIG. 1.
Figure 4:
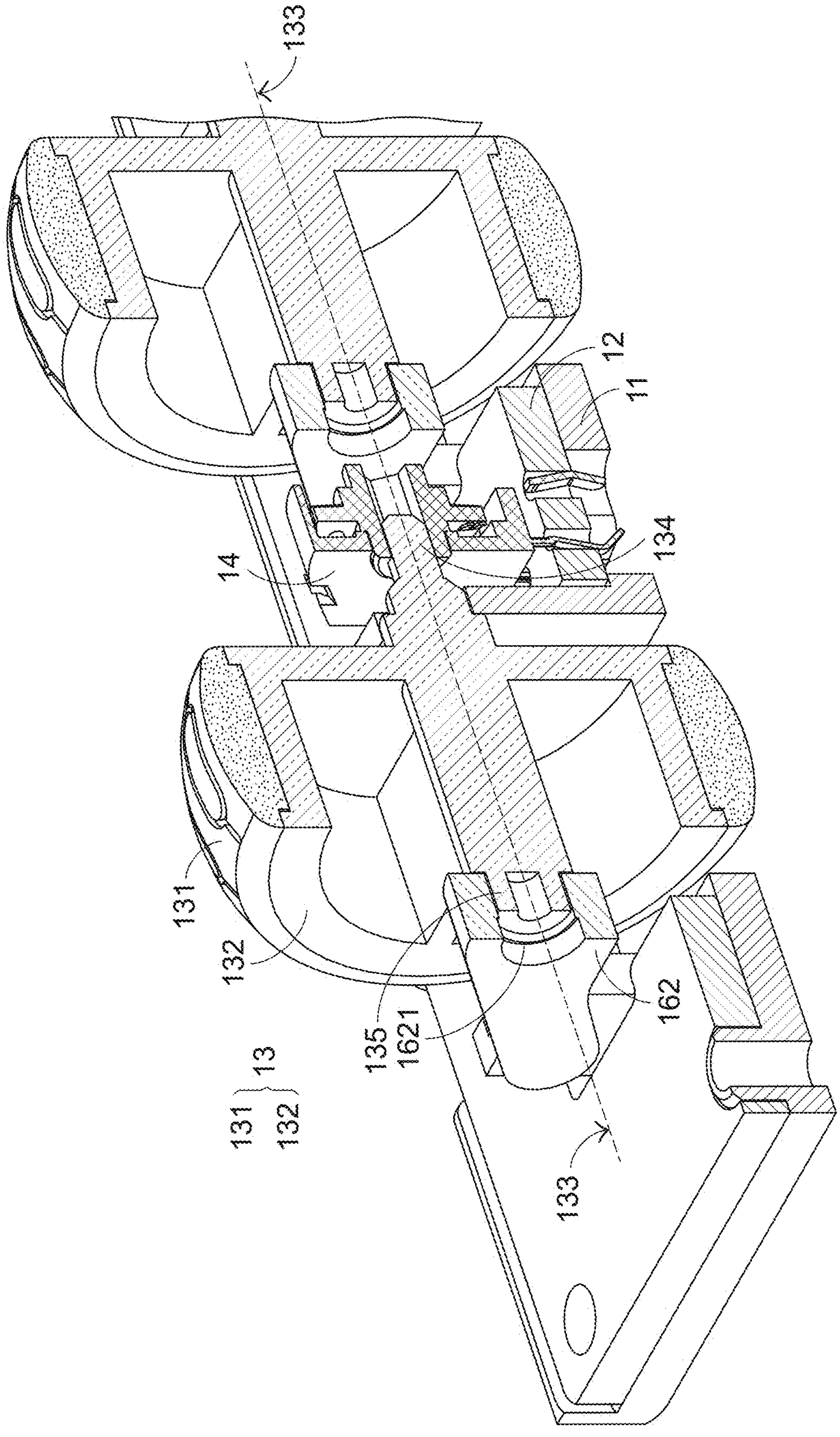
FIG. 4 is a schematic cutaway view illustrating a portion of the roller module shown in FIG. 1 and taken along the line A-A.
Figure 5:
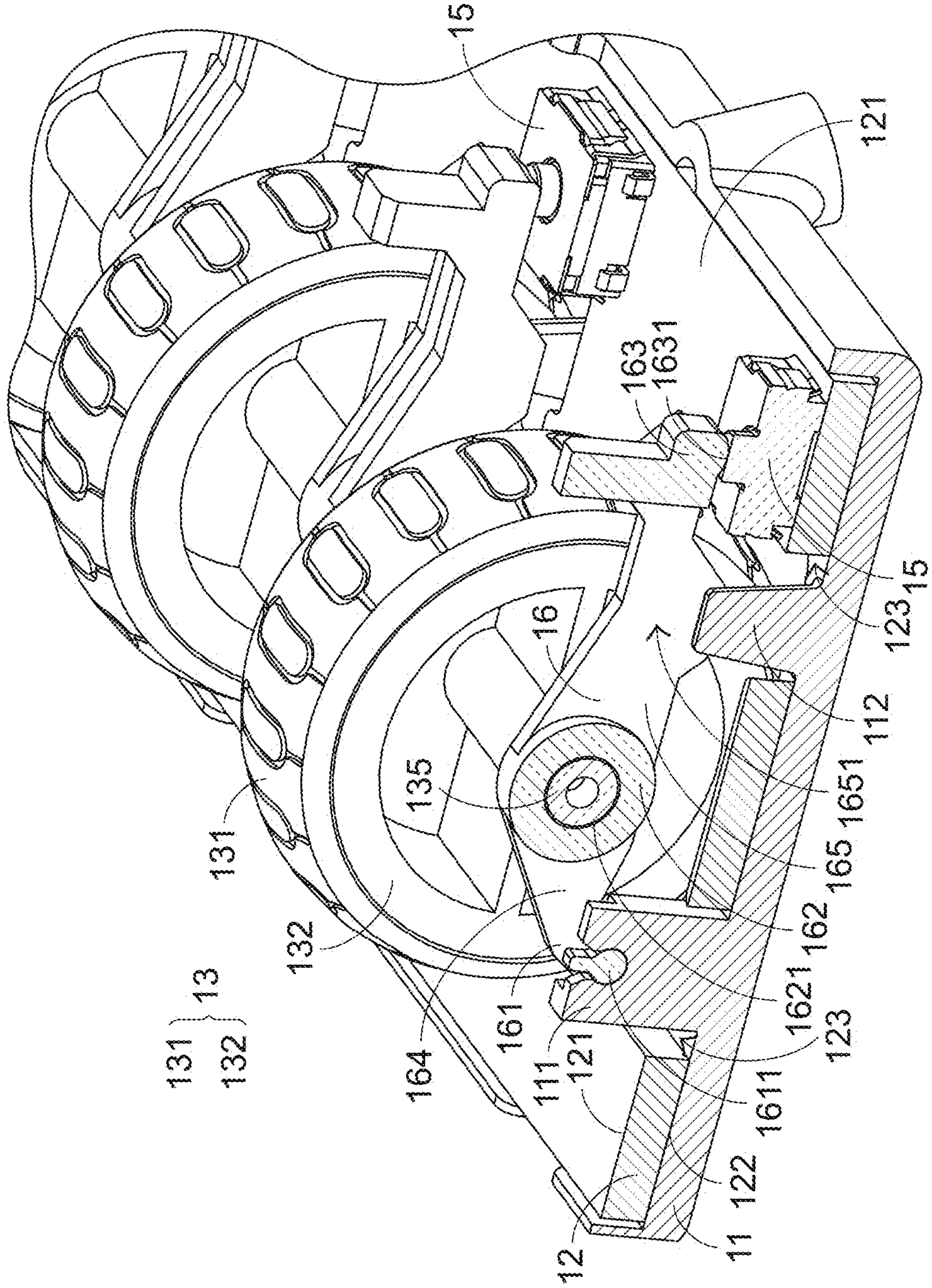
FIG. 5 is a schematic cutaway view illustrating a portion of the roller module shown in FIG. 1 and taken along the line B-B.

The present invention provides a roller module. FIG. 1 is a schematic perspective view illustrating a roller module according to an embodiment of the present invention. FIG. 2 is a schematic exploded view illustrating the roller module shown in FIG. 1. FIG. 3 is a schematic top view illustrating the roller module shown in FIG. 1. FIG. 4 is a schematic cutaway view illustrating a portion of the roller module shown in FIG. 1 and taken along the line A-A. FIG. 5 is a schematic cutaway view illustrating a portion of the roller module shown in FIG. 1 and taken along the line B-B. As shown in FIGS. 1, 2, 3, 4 and 5, the roller module 1 includes a base member 11, a circuit board 12, a roller 13, an encoder 14, a push switch 15 and a bracket 16.

The base member 11 includes a hook 111 and a positioning piece 112. The roller module 1 of the present invention can be applied to an electronic device, and the base member 11 is a part of a casing (e.g., a lower casing) of the electronic device. For example, the electronic device is a mouse, a keyboard, a video control device, a video editing device, or the like.

The circuit board 12 is located over the base member 11. The circuit board 12 has a top surface 121, a bottom surface 122 and an opening 123. The bottom surface 122 faces the base member 11. The opening 123 runs through the top surface 121 and the bottom surface 122. The hook 111 and the positioning piece 112 of the base member 11 are penetrated upwardly through the opening 123 and then exposed outside. In addition, the encoder 14 and the push switch 15 are disposed on the top surface 121 of the circuit board 12.

The roller 13 includes an operating part 131 and a turntable part 132. The operating part 131 and the turntable part 132 are fixed together. In addition, both of the operating part 131 and the turntable part 132 can be rotated synchronously along the same rotation axis line 133. In an embodiment, the turntable part 132 includes a first rotating shaft 134 and a second rotating shaft 135. The first rotating shaft 134 and the second rotating shaft 135 are respectively protruded from two opposite sides of the turntable part 132 along the rotation axis line 133. The first rotating shaft 134 is connected with the encoder 14. Moreover, a portion of the roller 13 is penetrated downwardly through the opening 123 of the circuit board 12.

In an embodiment, the encoder 14 is a rotary encoder. The encoder 14 is used to convert the rotation position or the rotation amount into an analog signal or a digital signal. For example, the encoder 14 is a mechanical encoder, and the first rotating shaft 134 of the roller 13 is inserted into the mechanical encoder. During the rotation of the roller 13, the first rotating shaft 134 can drive the synchronous movement of an encoding disk in the encoder 14. In response to the movement of the encoding disk, the encoder 14 senses the rolling direction and the rolling amount of the roller 13 and outputs a corresponding rotation signal. It is noted that the type of the encoder may be varied according to the practical requirements. For example, in some other embodiments, the encoder is a capacitive encoder, an optical encoder or a magnetic encoder as long as it can be linked with the first rotating shaft 134 and be implemented according to the concepts of the present invention.

The bracket 16 includes a fulcrum part 161, an effort part 162, a load part 163, a first arm 164 and a second arm 165. The effort part 162 is arranged between the fulcrum part 161 and the load part 163. The fulcrum part 161 and the effort part 162 are connected with each other through the first arm 164. The effort part 162 and the load part 163 are connected with each other through the second arm 165.

In an embodiment, the fulcrum part 161 includes a rotating shaft 1611. After the rotating shaft 1611 is installed in the hook 111 of the base member 11, the bracket 16 can be rotated by using the rotating shaft 1611 as the fulcrum.

The effort part 162 of the bracket 16 includes a sleeve 1621. The second rotating shaft 135 of the roller 13 is accommodated within the sleeve 1621. In an embodiment, the sleeve 1621 is a through-hole structure. The structure of the sleeve 1621 is not restricted as long as the second rotating shaft 135 can be accommodated therein and not disengaged. For example, in some other embodiments, the sleeve 1621 is a blind hole structure.

The load part 163 of the bracket 16 is contacted with the top side of the push switch 15. When the user presses down the roller 13, a pressing force is transmitted to the effort part 162 of the bracket 16 through the second rotating shaft 135. Meanwhile, the fulcrum part 161 of the bracket 16 is used as a support structure, and the load part 163 at the other end is moved downwardly to trigger the push switch 15.

In an embodiment, a protrusion structure 1631 to be contacted with the push switch 15 is formed on a bottom side of the load part 163 of the bracket 16. Since the protrusion structure 1631 is contacted with the push switch 15, the user can trigger the underlying push switch 15 in a more labor-saving and more accurate manner.

However, in case that the bracket 16 is shifted to the two lateral sides during movement, the push switch 15 cannot be effectively triggered. In order to prevent the bracket 16 from shifting to the two lateral sides, the roller module 1 is further equipped with a guiding mechanism. The guiding mechanism includes the positioning piece 112 and a corresponding position-limiting hole 1651. The positioning piece 112 is formed on the base member 11. The position-limiting hole 1651 is formed in the second arm 165 to accommodate the positioning piece 112 that is upwardly protruded. Consequently, when the roller 13 is pressed down by the user and the bracket 16 is correspondingly rotated, the bracket 16 will not be shifted to the left or right because the positioning piece 112 is firmly inserted into the position-limiting hole 1651. In an embodiment, the position-limiting hole 1651 is a through-hole structure. The structure of the position-limiting hole 1651 is not restricted as long as the positioning piece 112 can be inserted into the position-limiting hole 1651 to achieve the guiding and positioning purposes. For example, in some other embodiments, the position-limiting hole 1651 is a blind hole structure.

In some embodiments, the electronic device includes plural roller modules 1. These roller modules 1 are arranged horizontally side by side. Under this circumstance, the rollers 13 of the roller modules 1 are aligned with the same rotation axis line 133. In order to save space inside the electronic device and prevent the plural side-by-side roller modules from occupying too much space, the present invention provides a structural design that allows the rollers to be compactly arranged. In the structural design of the present invention, the installation position of the push switch 15 is changed. That is, the push switch 15 is no longer located under the second rotating shaft 135 of the roller 13. Especially, in accordance with the present invention, the push switch 15 is installed on a position away from the second rotating shaft 135 and installed on a position of the circuit board 12 close to the operating parts 131 of two adjacent rollers 13. When the roller 13 is pressed down, the bracket 16 linked with the roller 13 triggers the push switch 15. Since the width W1 of the bracket 16 is smaller than the width W2 of the push switch 15, the spacing distance between the adjacent roller modules 1 can be reduced, and the purpose of installing rollers in a compact arrangement can be achieved.

Furthermore, in the roller module 1 of this embodiment, the push switch 15 on the circuit board 12 is located at the position away from the second rotating shaft 135 of the roller 13. Since the length of the second rotating shaft 135 can be reduced, it is helpful to reduce the space inside the electronic device for accommodating the roller module 1.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A roller module, comprising:

a roller comprising an operating part and a turntable part, wherein the operating part and the turntable part are rotatable synchronously along a rotation axis line, and a first rotating shaft and a second rotating shaft are respectively protruded from two opposite sides of the turntable part along the rotation axis line;

a circuit board, wherein an encoder and a push switch are disposed on the circuit board, and the first rotating shaft is connected with the encoder, wherein the circuit board has a top surface a bottom surface and an opening, wherein the opening is in communication with the top surface and the bottom surface, and a portion of the roller is penetrated downwardly through the opening:

a base member, and the base member is located under the circuit board, wherein the base member comprises a hook, and the hook is penetrated upwardly through the opening and then exposed outside; and a bracket comprising a fulcrum part, an effort part and a load part, wherein the effort part is arranged between the fulcrum part and the load part, the effort part comprises a sleeve, the second rotating shaft is accommodated within the sleeve, and the load part is contacted with a top side of the push switch, wherein the fulcrum part and the effort part are connected with each other through a first arm, and the effort part and the load part are connected with each other through a second arm, wherein the second arm comprises a position-limiting hole, and the base member comprises a positioning piece, wherein the positioning piece is penetrated upwardly through the opening and inserted into the position-limiting hole, wherein when the roller is pressed down, the fulcrum part is a support structure, and the load part is moved downwardly to trigger the push switch.

2. The roller module according to claim 1, wherein the position-limiting hole is a through-hole structure or a blind hole structure.

3. The roller module according to claim 1, wherein the fulcrum part comprises a rotating shaft, and the rotating shaft is installed in the hook, so that the bracket is rotatable by using the rotating shaft as a fulcrum.

4. The roller module according to claim 1, wherein the encoder is a mechanical encoder, and the first rotating shaft is inserted into the mechanical encoder.

5. The roller module according to claim 1, wherein a protrusion structure is formed on a bottom side of the load part of the bracket, and the protrusion structure is contacted with the push switch.

6. The roller module according to claim 1, wherein a width of the bracket is smaller than a width of the push switch along a direction in parallel with the rotation axis line.

* * * * *